US009099889B2

(12) United States Patent
Sato et al.

(10) Patent No.: US 9,099,889 B2
(45) Date of Patent: Aug. 4, 2015

(54) CHARGE CONTROL DEVICE CONTROLLING DISCHARGE OF POWER

(75) Inventors: Hiroshi Sato, Nagoya (JP); Hisazumi Watanabe, Neyagawa (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 890 days.

(21) Appl. No.: 13/112,271

(22) Filed: May 20, 2011

(65) Prior Publication Data

US 2011/0285206 A1 Nov. 24, 2011

(30) Foreign Application Priority Data

May 24, 2010 (JP) ................................ 2010-118527

(51) Int. Cl.
B60R 16/03 (2006.01)
H02J 7/14 (2006.01)
H02J 7/34 (2006.01)

(52) U.S. Cl.
CPC .............. *H02J 7/1423* (2013.01); *H02J 7/1438* (2013.01); *H02J 7/1446* (2013.01); *H02J 7/345* (2013.01); *Y02T 10/92* (2013.01)

(58) Field of Classification Search
CPC .. H02J 17/2423; H02J 17/1446; B60R 16/03; Y02T 10/7258
USPC ................................................. 307/9.1, 10.1
See application file for complete search history.

(56) References Cited

U.S. PATENT DOCUMENTS

| 7,573,151 | B2* | 8/2009 | Acena et al. ................... 307/9.1 |
| 7,740,092 | B2* | 6/2010 | Bender ....................... 180/65.29 |
| 8,138,720 | B2* | 3/2012 | Snyder et al. ................. 320/127 |
| 8,475,328 | B2* | 7/2013 | Rouis et al. ........................ 477/3 |
| 2003/0222502 | A1* | 12/2003 | Takahashi et al. .............. 307/18 |
| 2006/0098390 | A1* | 5/2006 | Ashtiani et al. ............... 361/502 |
| 2006/0250902 | A1* | 11/2006 | Bender et al. ..................... 369/1 |
| 2008/0208494 | A1* | 8/2008 | Holz et al. ....................... 702/64 |
| 2009/0212626 | A1* | 8/2009 | Snyder et al. ................. 307/10.1 |
| 2010/0181828 | A1* | 7/2010 | Handa et al. ................... 307/9.1 |
| 2011/0227540 | A1* | 9/2011 | Kanoh et al. ................... 320/135 |

FOREIGN PATENT DOCUMENTS

| JP | 2001-261246 A | 9/2001 |
| JP | 2002-165303 A | 6/2002 |

(Continued)

OTHER PUBLICATIONS

Japanese Office Action, issued Apr. 24, 2012, in Japanese Patent Application No. 2010-118527.

*Primary Examiner* — Adi Amrany

(74) *Attorney, Agent, or Firm* — Sughrue Mion, PLLC

(57) ABSTRACT

A power unit is equipped with a power generator connected to an electric load, a first storage device connected to the electric load and the power generator, a second storage device connected to the electric load, the power generator, and the first storage device, and a charge control device that controls charge/discharge of the second storage device. The charge control device controls the discharge of the second storage device such that a power is supplied to the electric load and the first storage device when a predetermined condition corresponding to a high possibility of an increase in a power generation amount of the power generator is fulfilled, and controls the discharge of the second storage device such that a power is supplied to the electric load when the predetermined condition is not fulfilled.

4 Claims, 5 Drawing Sheets

(56) References Cited

FOREIGN PATENT DOCUMENTS

| | | | |
|---|---|---|---|
| JP | 2002-325373 A | 11/2002 |
| JP | 3417510 B2 | 4/2003 |
| JP | 2006-191758 A | 7/2006 |
| JP | 3838478 B2 | 8/2006 |
| JP | 4006948 B2 | 9/2007 |
| JP | 2008-054484 A | 3/2008 |
| JP | 4258731 B2 | 2/2009 |
| JP | 2009-261091 A | 11/2009 |

* cited by examiner

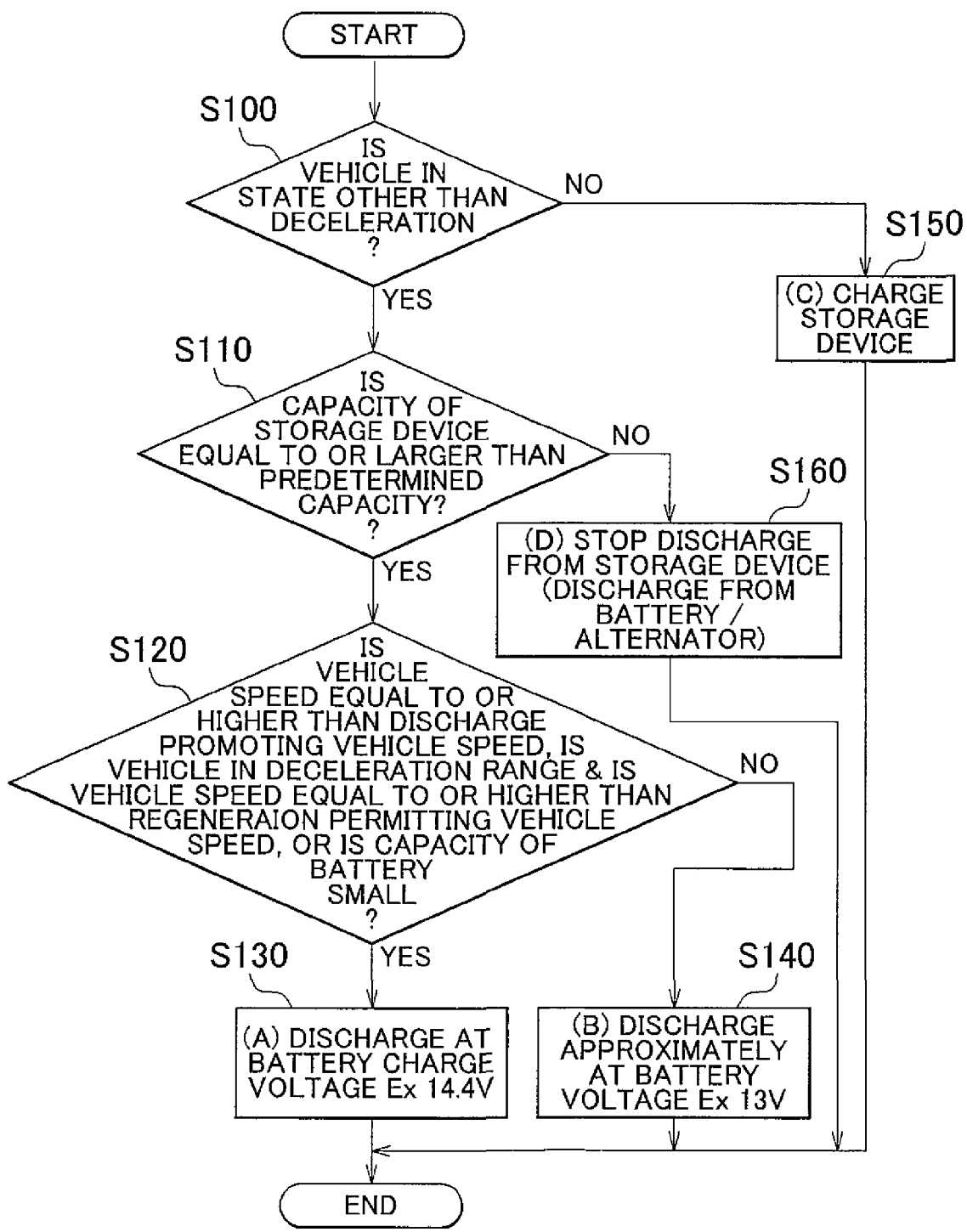

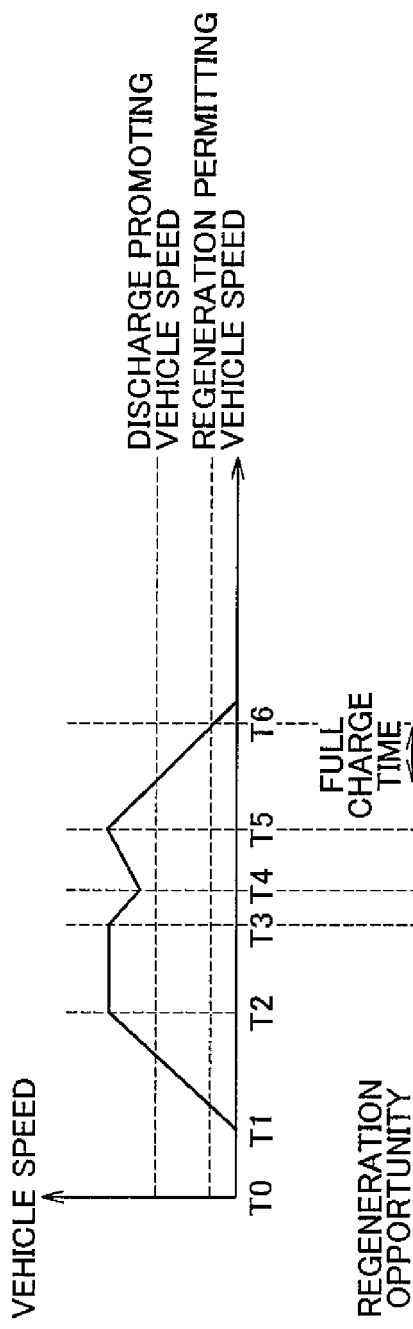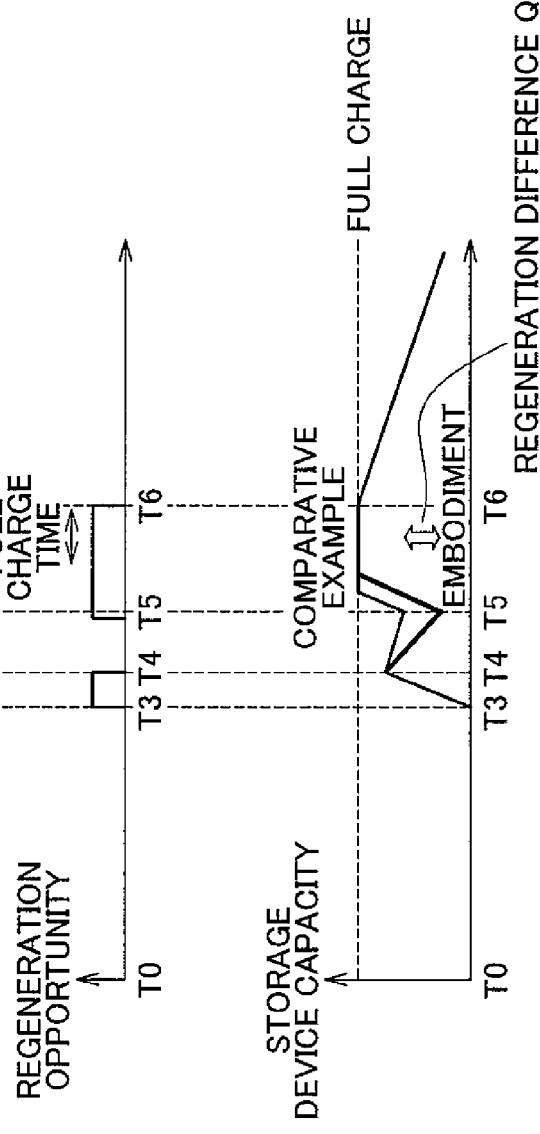

CHARGE CONTROL DEVICE CONTROLLING DISCHARGE OF POWER

BACKGROUND OF THE INVENTION

1. Field of the Invention

The invention relates to a power unit, and more particularly, to a power unit having a power generator connected to an electric load, a first storage device, and a second storage device.

2. Description of the Related Art

Conventionally, there is known a dual power supply vehicle power unit that is equipped with a first battery charged by a power generator driven by an engine and a second battery that feeds a power to an on-vehicle electric load and carries out concerted discharge from both the first battery and the second battery when the first battery does not have a capacity sufficient to drive the electric load alone (e.g., see Japanese Patent No. 4258731).

In the dual power supply vehicle power unit described in Japanese Patent No. 4258731, the first battery is designed to be capable of storing a power regenerated through regenerative braking by the power generator during the braking of a vehicle and then discharging the stored regenerative power to the electric load.

However, in the configuration described in the aforementioned Japanese Patent No. 4258731, when the first battery is fully charged or almost fully charged, it is impossible to sufficiently charge the first battery with a generated regenerative power even when there is an opportunity for regeneration. Thus, an opportunity for regenerative charge, which has the best fuel efficiency, is passed up, and there is caused a problem in that a sufficient regeneration effect cannot be achieved.

SUMMARY OF THE INVENTION

The invention provides a power unit that can carry out charge with high charge efficiency when a power generation amount of a power generator is large.

A power unit according to an aspect of the invention has a power generator connected to an electric load, a first storage device connected to the electric load and the power generator, a second storage device connected to the electric load, the power generator, and the first storage device, and a charge control device that controls charge/discharge of the second storage device. The charge control device controls the discharge of the second storage device such that a power is supplied to the electric load and the first storage device when a predetermined condition corresponding to a high possibility of an increase in a power generation amount of the power generator is fulfilled, and controls the discharge of the second storage device such that a power is supplied to the electric load when the predetermined condition is not fulfilled.

Thus, when the power generation amount of the power generator is likely to become large, the discharge from the second storage device, which is charged from the power generator, is promoted to make it possible to increase a capacity for possible storage at a high speed. As a result, an increasing amount of generated power can be efficiently used for charge.

In the aforementioned power unit, the charge control device may supply the power to the electric load and the first storage device by causing the second storage device to discharge at a charge permitting voltage permitting the first storage device to be charged, and may supply the power to the electric load by causing the second storage device to discharge at a voltage higher than a discharge voltage of the first storage device and lower than the charge permitting voltage.

Thus, charge control can be performed by controlling the discharge voltage of the second storage device. As a result, the charge efficiency can be enhanced through simple control.

In the aforementioned power unit, the second storage device may have a smaller storage capacity than the first storage device.

Thus, even in the case where a storage device other than a battery, such as a capacitor or the like, is employed as the second storage device, the charge efficiency can be enhanced.

The aforementioned power unit may be mounted on a vehicle. The charge control device may control the discharge of the second storage device when the vehicle is not decelerating.

Thus, the charge efficiency can be enhanced when a regenerative power is likely to be generated. As a result, a contribution to an improvement in fuel economy can be made.

In the aforementioned power unit, the predetermined condition may be that a speed of the vehicle be equal to or higher than a vehicle speed at which the discharge of the second storage device is promoted, that a transmission or a shift lever of the vehicle be in a deceleration range and the speed of the vehicle be equal to or higher than a predetermined regeneration permitting vehicle speed, or that a storage amount of the first storage device be equal to or smaller than a predetermined amount.

Thus, a determination on a state in which a regenerative power is likely to be generated can be made. The storage efficiency of the regenerative power can be enhanced by causing the second storage device to discharge at this timing.

In the aforementioned power unit, the charge control device may control the charge of the second storage device such that the second storage device is charged with a power generated by the power generator when the vehicle is decelerating.

Thus, when a regenerative power is generated, a changeover to charge is immediately made, so that charge can be carried out.

According to the aspect of the invention, discharge is carried out in preparation for a case where the power generation amount of the power generator is likely to become large. As a result, the charge efficiency can be enhanced when the power generation amount is large.

BRIEF DESCRIPTION OF THE DRAWINGS

The features, advantages, and technical and industrial significance of this invention will be described in the following detailed description of an example embodiment of the invention with reference to the accompanying drawings, in which like numerals denote like elements, and wherein:

FIG. 2 is a view showing the flow of a control operation performed by the power unit according to the embodiment of the invention;

FIG. 4 is composed of views explaining an effect of enhancing the regenerative power efficiency by the power unit according to the embodiment of the invention, FIG. 4A being a view showing a vehicle speed, FIG. 4B being a view showing a regeneration opportunity, and FIG. 4C being a view showing a storage capacity of a storage device of the power unit according to the embodiment of the invention in comparison with a comparative example.

DETAILED DESCRIPTION OF EMBODIMENT

A mode for carrying out the invention will be described hereinafter with reference to the drawings.

Figure 1:
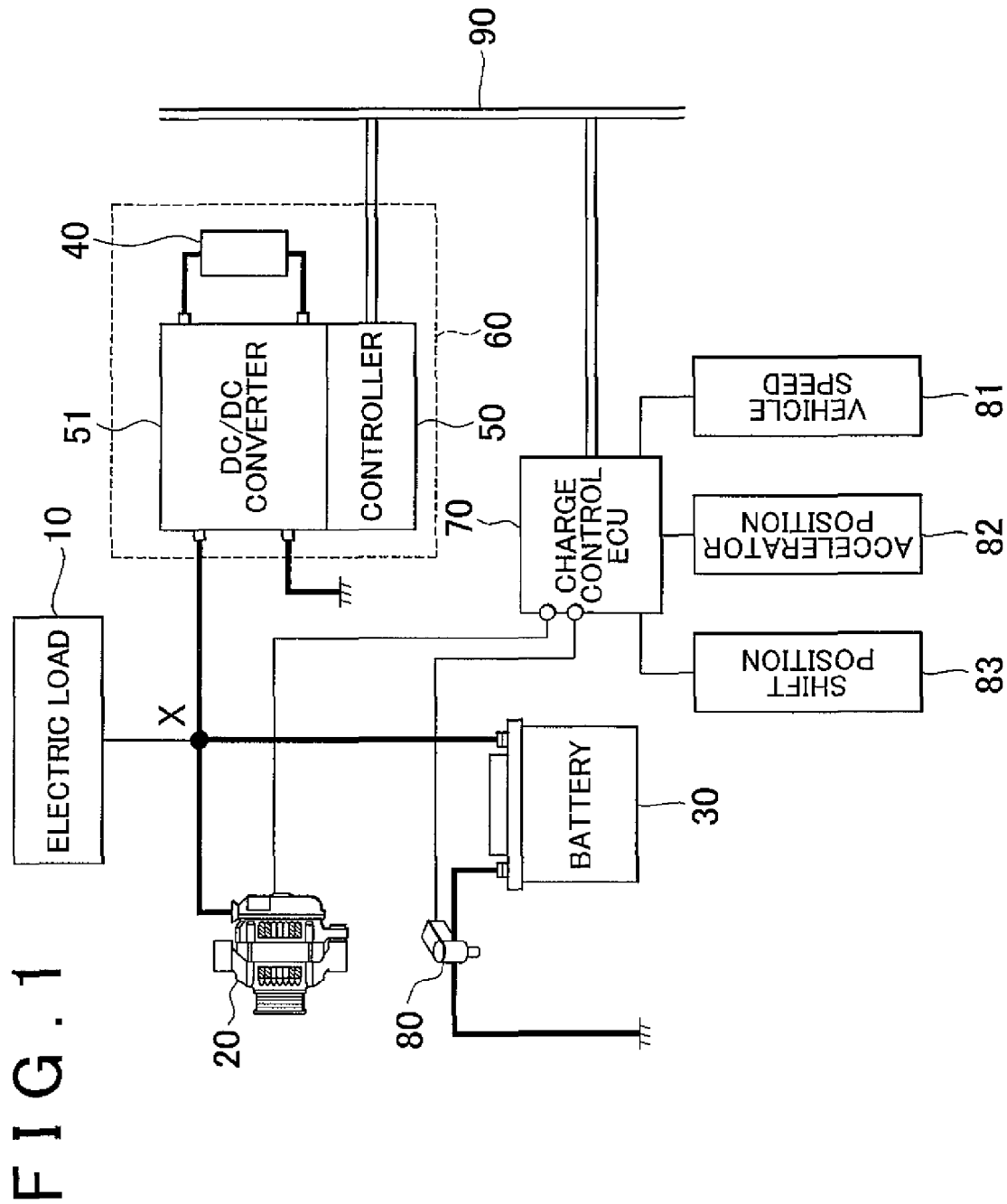
FIG. 1 is a view showing an example of an overall configuration of a power unit according to the embodiment of the invention.

FIG. 1 is a view showing an example of an overall configuration of a power unit according to the embodiment of the invention. In FIG. 1, the power unit according to this embodiment of the invention is equipped with a power generator 20, a battery 30, a storage device 40, a controller 50, a DC/DC converter 51, a charge control electronic control unit (ECU) 70, a current sensor 80, a vehicle speed sensor 81, an accelerator position sensor 82, a shift position sensor 83, and a communication line 90. It should be noted that the storage device 40, the controller 50, and the DC/DC converter 51 constitute a storage device charge/discharge unit 60. Further, in FIG. 1, an electric load 10 to which power is supplied from the power unit is also illustrated.

The power generator 20, the battery 30, and the storage device 40 are connected to the electric load 10. It should be noted that the storage device 40 is connected to the electric load 10 via the DC/DC converter 51. Further, the power generator 20, the battery 30, and the storage device 40 are also connected to one another at a connection point X, to which the electric load 10 is further connected. Thus, a power generated by the power generator 20 can be supplied to all of the electric load 10, the battery 30, and the storage device 40. Further, there is adopted a wiring arrangement in which a power can be supplied to both the electric load 10 and the battery 30 from the storage device 40 as well.

Further, the power generator 20, the current sensor 80, the vehicle speed sensor 81, the accelerator position sensor 82, and the shift position sensor 83 are connected to the charge control ECU 70. The current sensor 80 is connected to the battery 30.

The DC/DC converter 51 is connected to the storage device 40, and also to the electric load 10, the power generator 20, and the battery 30. The DC/DC converter 51 is inserted and connected between the storage device 40 on the one hand and the electric load 10, the power generator 20, and the battery 30 on the other hand. The controller 50 is connected to the DC/DC converter 51. Further, the controller 50 is connected to the charge control ECU 70 via the communication line 90.

The power unit according to this embodiment of the invention has the foregoing configuration. The individual components of the power unit will be described hereinafter.

The electric load 10 may include various instruments that operate by being driven by power. In the case where the power unit is mounted on a vehicle, the electric load 10 may be an instrument that relates the driving of an engine such as an igniter or the like, a light, or the like.

The power generator 20 is a device that generates a power and supplies the generated power to at least one of the electric load 10, the battery 30 and the storage device 40. Various power generation devices can be employed as the power generator 20 as long as they can generate a power. For example, in the case where the power unit according to this embodiment of the invention is mounted on a vehicle, an alternator that generates power through the rotation of an engine may be employed as the power generator 20.

The battery 30 is a power supply that supplies power to the electric load 10. A storage battery is employed as the battery 30. Various storage batteries may be employed as the battery 30. For example, however, in the case where the power unit according to this embodiment of the invention is mounted on a vehicle, a lithium-ion battery or a lead battery is employed as the battery 30. In this embodiment of the invention, an example in which a lead battery mounted on a common gasoline-powered vehicle is employed as the battery 30 will be described.

The storage device 40 is a device for assisting the battery 30, storing a power generated by the power generator 20, and supplying the stored power to the electric load 10 and the battery 30. When the power generator 20 supplies no power to the electric load 10, the battery 30 needs to continue to discharge to constantly supply power to the electric load 10. Therefore, the storage device 40 swiftly stores the power generated by the power generator 20.

Various devices capable of storing power can be employed as the storage device 40. For example, a capacitor may be employed as the storage device 40. In addition, a lithium-ion battery, a nickel-hydrogen storage battery, or the like may be employed as the storage device 40. However, the storage device 40 is employed to assist the battery 30. Therefore, a device having a smaller storage capacity than the battery 30, such as a capacitor or the like, is preferably employed to avoid an increase in cost or an increase in space.

The controller 50 is a charge control device that controls the set voltage of the DC/DC converter 51 to control the charge/discharge of the storage device 40. The controller 50 performs a calculation processing for controlling the set voltage of the DC/DC converter 51, and hence may be configured as a microcomputer that is mounted with a predetermined electronic circuit and a central processing unit (a CPU) and operates according to a program.

For example, in causing the storage device 40 to supply power to the electric load 10, the controller 50 sets an output voltage of the DC/DC converter 51 slightly higher than a discharge voltage of the battery 30 (lower than 1V, for example, about 0.3 to 0.5 V), so that almost all the power is supplied to the electric load 10. Further, in causing the storage device 40 to supply power to both the electric load 10 and the battery 30, the controller 50 sets the output voltage of the DC/DC converter 51 near an upper-limit of a generation voltage set for the power generator 20, so that the power is supplied not only to the electric load 10 but also to the battery 30. In contrast, in causing the storage device 40 to store power, the controller 50 sets the output voltage lower than the generation voltage of the power generator 20, thereby making it possible to charge the storage device 40 with the power supplied from the power generator 20. In this manner, the controller 50 controls the output set voltage of the DC/DC converter 51 to thereby control the charge/discharge of the storage device 40.

The DC/DC converter 51 is a voltage conversion device for converting a voltage of the storage device 40 into a predetermined set voltage. The voltage of the storage device 40 greatly fluctuates. Therefore, the DC/DC converter 51 carries out voltage conversion such that a certain voltage is output. As described above, the set voltage is given as a command from the controller 50. By outputting the commanded set voltage, the DC/DC converter 51 can control the charge/discharge of the storage device 40.

Thus, the controller 50 and the DC/DC converter 51 cooperate with each other to control the charge/discharge of the storage device 40. Accordingly, the DC/DC converter 51 as well as the controller 50 may be called the charge control device for the storage device 40.

Further, the storage device 40, the controller 50, and the DC/DC converter 51 make the charge/discharge of the storage device 40 function as a whole. Therefore, these components, namely, the storage device 40, the controller 50, and the DC/DC converter 51 constitute the storage device charge/discharge unit 60.

The charge control ECU 70 is a control device that performs the charge control of the entire power unit according to the invention. As described above, the charge/discharge of the storage device 40 is controlled by controlling the set output voltage of the DC/DC converter 51. A timing for changing the set voltage is determined in consideration of a state of the battery 30. In the case where the power unit according to this embodiment of the invention is mounted on a vehicle, a timing for changing the set voltage is determined in consideration of a state of the vehicle or the like. Further, the charge control ECU 70 also controls the power generation voltage of the power generator 20 in view of the state of the vehicle. Thus, there is adopted a configuration in which the charge control ECU 70 makes a comprehensive determination on the whole and issues a control command to the controller 50 via the communication line 90. In this manner, the charge control ECU 70 determines at which timing charge control is to be performed and how charge control is to be performed, and hence functions as the charge determination device.

It should be noted that the example in which the controller 50 and the charge control ECU 70 are configured separately from each other is cited in FIG. 1, there may also be adopted a configuration in which the controller 50 is incorporated as part of the charge control ECU 70. In this case, the charge control ECU 70 or the charge control ECU 70 and the controller 50 function as the charge control device for the storage device 40 and the charge determination device for the storage device 40.

The current sensor 80 is a current detection device for detecting a charge/discharge current amount of the battery 30. Further, the current sensor 80 sends a signal based on the detected charge/discharge current to the charge control ECU 70. The charge control ECU 70 calculates a battery capacity on the basis of the received signal. It should be noted that various current detecting devices such as a Hall integrated circuit (IC) and the like may be employed as the current sensor 80.

The vehicle speed sensor 81 detects a speed of a running vehicle in the case where the power unit according to this embodiment of the invention is mounted on the vehicle. Thus, it is possible to detect whether or not the vehicle is decelerating. A signal based on the vehicle speed detected by the vehicle speed sensor 81 is sent to the charge control ECU 70. The charge control ECU 70 determines on the basis of a vehicle speed signal whether or not the vehicle is decelerating, to efficiently recover a regenerative power.

The accelerator position sensor 82 is a device for detecting a position of an accelerator pedal of a vehicle in the case where the power unit according to this embodiment of the invention is mounted on the vehicle. The accelerator pedal position sensor 82 sends a signal based on the detected position of the accelerator pedal to the charge control ECU 70. Using an accelerator pedal position signal and the aforementioned vehicle speed signal, the charge control ECU 70 determines whether or not the vehicle is decelerating. For example, when the speed of the vehicle is on the decrease and the position of the accelerator pedal moves in such a direction that a depression amount thereof decreases, it is possible to determine that the vehicle is decelerating.

The shift position sensor 83 is a device for detecting a state of a shift lever or a transmission of a vehicle in the case where the power unit according to the embodiment of the invention is mounted on the vehicle. In the power unit according to this embodiment of the invention, for the sake of the efficient charging with a regenerative power, a determination is made on a state in which the power generation amount of the power generator 20 is likely to increase, namely, a state in which a deceleration state is likely to be entered. Such a state also includes a case where a shift position is in A deceleration range. Thus, the shift position sensor 83 detects whether or not the transmission or the shift lever is in a brake (B) range in the case of a vehicle mounted with a continuously variable transmission (a CVT), and detects whether or not the transmission or the shift lever is in a low (L) range in the case of other vehicles.

The communication line 90 is a line for establishing communication between the charge control ECU 70 and the controller 50. Various communication lines can be employed as the communication line 90 as long as they can establish communication between the charge control ECU 70 and the controller 50. For example, however, a controller area network (a CAN) may be employed as the communication line 90. Thus, the controller 50 and the charge control ECU 70 can be connected to each other through a network, share data with each other, and perform control in a cooperative manner.

Next, a control operation of the power unit according to this embodiment of the invention, which has the configuration shown in FIG. 1, will be described using FIG. 2. FIG. 2 is a view showing the flow of the control operation of the power unit according to this embodiment of the invention. It should be noted that components identical to those explained in FIG. 1 are denoted by the same reference symbols respectively and will not be described in the following description. Further, the flow of FIG. 2 explains a case where the power unit according to this embodiment of the invention is mounted on a vehicle and functions as a vehicular power unit.

In FIG. 2, it is determined in step 100 whether or not the vehicle mounted with the power unit is in a state other than deceleration. The charge control ECU 70 determines whether or not the vehicle is in a state other than deceleration, on the basis of a vehicle speed detected by the vehicle speed sensor 81 and a position of the accelerator pedal detected by the accelerator position sensor 82. For example, the charge control ECU 70 may determine that the vehicle is decelerating when the vehicle speed is on the decrease and the depression amount of the accelerator pedal is also on the decrease, and may determine that the vehicle is not decelerating when this condition is not fulfilled.

When it is determined in step 100 that the vehicle is decelerating, a shift to step 150 is made. When it is determined in step 100 that the vehicle is not decelerating, a shift to step 110 is made.

It is determined in step 110 whether or not the storage capacity (also referred to as storage amount) of the storage device 40 is equal to or larger than a predetermined capacity. The controller 50 may monitor the voltage of the storage device 40 to determine whether or not the storage capacity of the storage device 40 is equal to or larger than the predetermined capacity. For example, in the case where the storage device 40 is a capacitor, the storage capacity can be easily calculated from a relationship $Q=CV$ ($Q$ represents a quantity of electric charges and is also referred to as storage amount, $C$ represents an electrostatic capacity, and $V$ represents a voltage). Thus, in the case where the storage device 40 is a capacitor, it may be determined whether or not the storage capacity of the storage device 40 is equal to or larger than the predetermined capacity, depending on whether or not the voltage of the storage device 40 is equal to or higher than a predetermined voltage. That is, when the voltage of the storage device 40 is equal to or higher than the predetermined voltage, the controller 50 can determine from the aforementioned relationship Q=CV that the storage capacity of the storage device 40 is equal to or larger than the predetermined capacity.

When it is determined in step 110 that the storage capacity (i.e. storage amount) of the storage device 40 is equal to or larger than the predetermined capacity and the storage device 40 has electric charges stored therein, a shift to step 120 is made. When it is determined in step 110 that the storage capacity of the storage device 40 is smaller than the predetermined capacity and the storage device 40 does not have electric charges stored therein, a shift to step 160 is made.

It is determined in step 160 whether or not the power generation amount of the power generator 20 is likely to increase. It should be noted in this operation flow that a state in which the power generation amount of the power generator 20 is likely to increase means a state in which the power generator 20 is likely to generate a regenerative power permitting charge. It may be determined whether or not the power generation amount of the power generator 20 is likely to increase, depending on whether or not a predetermined condition under which the power generation amount of the power generator 20 is likely to increase is fulfilled. More specifically, a condition that the speed of the vehicle be equal to or higher than a discharge promoting vehicle speed, a condition that the speed of the vehicle be equal to or higher than a vehicle speed permitting regeneration when the transmission of the vehicle or the shift lever of the vehicle is in a deceleration range, a condition that the storage amount of the battery 30 correspond to a small capacity (the storage amount of the battery 30 correspond to a capacity smaller than a predetermined capacity), or the like can be mentioned as the predetermined condition.

In the example of the aforementioned predetermined condition, the discharge promoting vehicle speed is a high vehicle speed at which the vehicle is likely to decelerate and the discharge of the storage device 40 is promoted in preparation for deceleration. The discharge promoting vehicle speed may be set to, for example, about 40 to 50 km/h.

When the transmission of the vehicle or the shift lever of the vehicle is in the deceleration range, the deceleration range means, for example, a brake (B) range in the case of a CVT vehicle, and a low (L) range, a 2nd range or the like in the case of other vehicles such as a gasoline-powered vehicle. Further, the vehicle speed permitting regeneration is a lowest vehicle speed at which a regenerative power can be stored, and may be set to, for example, about 10 to 15 km/h. In the case where the vehicle is in the deceleration range, there is a high possibility of subsequent deceleration, and the vehicle runs at a vehicle speed permitting regeneration. Therefore, the regenerative power can be stored during deceleration.

The case where the storage amount of the battery 30 corresponds to a small capacity means a state in which the battery 30 side is ready to be charged, rather than a state in which a regenerative power is likely to be generated. That is, this is a condition for confirming that a power can be stored on the battery 30 side in the case where the storage device 40 discharges to supply the power to the battery 30. It should be noted that the storage amount of the battery 30 is obtained by detecting a charge/discharge current by the current sensor 80 and calculating a state of charge (SOC). It may be determined that the storage amount of the battery 30 corresponds to a small capacity when the SOC is smaller than a set value.

For example, in the case where a condition as described above is fulfilled, it is determined that the storage device 40 is desired to discharge quickly in preparation for storage. Other conditions, if any, under which the power generation amount of the power generator 20 is considered to become large can be appropriately set. Various predetermined conditions for determining that the power generation amount of the power generator 20 is likely to increase can be determined in accordance with the purpose of use.

It should be noted that the charge control ECU 70, which functions as the charge determination device, may make determinations on these conditions. The charge control ECU 70 can determine whether or not the aforementioned predetermined conditions are fulfilled, and perform a network processing of sending a command of charge control to the charge control device 50, which controls the charge/discharge of the storage device 40. Further, in the case where the charge control ECU 70 and the controller 50 are integrated with each other so that the charge control ECU 70 is endowed with the function of the controller 50, the charge control ECU 70 may perform both a charge determination operation and the charge control for the storage device 40. Further, on the contrary, only various state data may be sent from the charge control ECU 70, and the controller 50 may make a charge determination to determine whether or not the predetermined condition under which the regenerative power is likely to be generated is fulfilled. In accordance with the purpose of use, it can be changed in various manners how the charge control ECU 70 and the controller 50 are endowed with the functions of the charge determination processing and the charge/discharge control respectively.

When one of the predetermined conditions under which the amount of power generated by the power generator 20 increases is fulfilled in step 120, a shift to step 130 is made. When none of the predetermined conditions is fulfilled in step 120, a shift to step 140 is made.

In step 130, electric charges stored in the storage device 40 are discharged at a battery charge voltage, namely, a voltage at which the battery 30 can be charged. The processing flow is then terminated. For example, when the discharge voltage of the battery is about 12.6 to 12.7 V, the battery charge voltage may be set to about 14.4 V, which is higher than the discharge voltage.

FIG. 3 are composed of views showing patterns of a final control process in the control operation flow shown in FIG. 2. FIG. 3A is a view showing an example of an operation corresponding to step 130 of FIG. 2. In FIG. 3A, it is illustrated how the electric load 10, the power generator 20, the battery 30, and the storage device 40 are connected to one another.

Figure 3A:
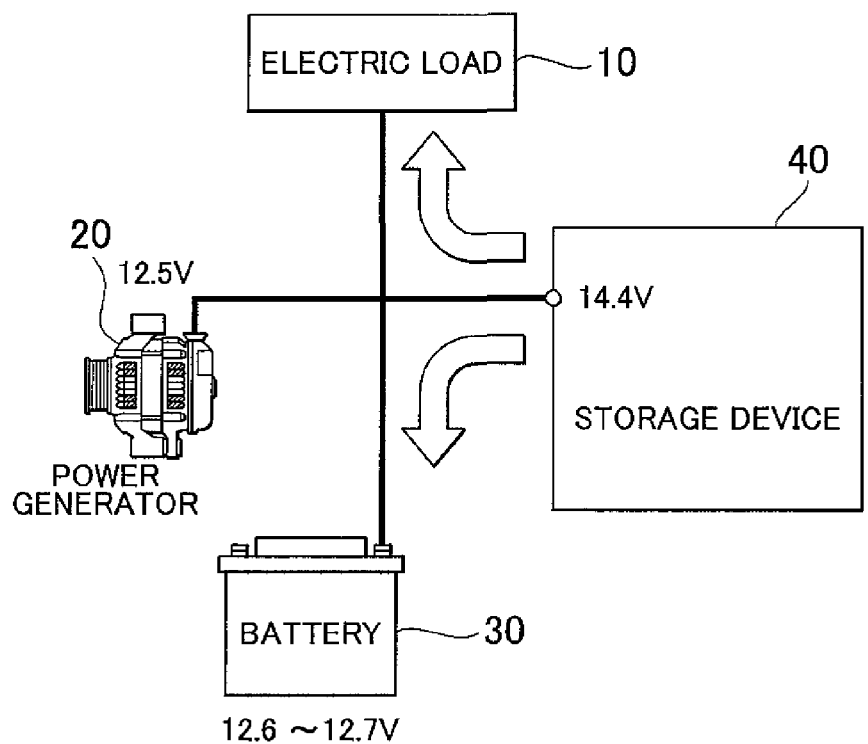
FIG. 3 is composed of views showing patterns of a final control process in the flow of the control operation shown in FIG. 2, FIG. 3A being a view showing an example of an operation corresponding to step 130 of FIG. 2, FIG. 3B being a view showing an example of an operation state of step 140 of FIG. 2, FIG. 3C being a view showing an example of an operation state of step 150 of FIG. 2, and FIG. 3D being a view showing an example of an operation state of step 160.

In FIG. 3A, the power generation voltage of the power generator 20 is set to 12.5 V, the discharge voltage of the battery 30 is set to 12.6 to 12.7 V, and the discharge voltage of the storage device 40 is set to 14.4 V. A power is supplied from the storage device 40 to both the electric load 10 and the battery 30.

In general, when the power generator 20 generates power, two levels of power generation voltages, namely, a voltage (e.g., 12.5 V) slightly lower than the battery voltage (e.g., 12.6 to 12.7 V) for supplying the power from the power generator 20 to the electric load 10 in the case of a decrease in the discharge voltage of the battery 30 and a voltage (e.g., 14.8 V) as an upper-limit voltage in charging the battery 30 are set. In this step, the storage device 40 discharges in the vicinity of a power generation voltage set as an upper-limit in the case where the power generator 20 charges the battery 30. For example, in the case where the set power generation voltage at the time when the power generator 20 charges the battery 30 is 14.8 V, the storage device 40 may discharge at about 14.2 to 14.8 V. In FIG. 3A, discharge is carried out at 14.4 V as described above. Thus, as shown in FIG. 3A, the power discharged from the storage device 40 is fed to both the electric load 10 and the battery 30, and the storage device 40 can swiftly discharge. The discharge voltage of the storage device 40 at this moment is a voltage at which the battery 30 can be charged, and hence may be called a battery charge permitting voltage. The battery charge permitting voltage can be set to a value at which the battery 30 can be charged and which is higher than the discharge voltage of the battery 30 and closer to the upper-limit set value of the power generation voltage of the power generator 20 than to the discharge voltage of the battery 30.

In this case, the discharge voltage of the storage device 40 is much higher than about 12.5 to 13 V, which is sufficient to drive the electric load 10, by about 2 V. Therefore, the discharge efficiency of the storage device 40 is not always high due to a battery charge/discharge loss. However, as determined in step 120, the generation of a regenerative power is expected afterward. Therefore, in order to recover this power with the highest efficiency, a processing of swiftly discharging the power stored in the storage device 40 is performed. Thus, the efficiency in recovering the regenerative power can be enhanced. As a result, the entire charge efficiency can be enhanced to contribute to an improvement in fuel economy.

It should be noted that the controller 50 and the DC/DC converter 51 may set the discharge voltage of the storage device 40.

Referring back to FIG. 2, when it is determined in step 120 that the predetermined conditions are not fulfilled and the power generation amount of the power generator 20 is not likely to increase, a shift to step 140 is made. The electric charges stored in the storage device 40 are then discharged at a voltage close to the battery discharge voltage and slightly higher than the battery voltage. The processing flow is then terminated. For example, in the case where the battery discharge voltage is about 12.6 to 12.7 V as in the case of the aforementioned example, the storage device 40 is caused to discharge at about 13 V. The discharge voltage of the storage device 40 is set higher than the battery discharge voltage and lower than the aforementioned battery charge permitting voltage. Thus, the discharge current from the storage device 40 can be used to drive the electric load 10 instead of being used to charge the battery 30. It should be noted that, as a numerical example, the discharge voltage of the storage device 40 may be set, for example, higher than the discharge voltage of the battery 30 by a voltage lower than 1 V, or higher than the discharge voltage of the battery 30 by a voltage lower than 0.5 V.

Figure 3B:
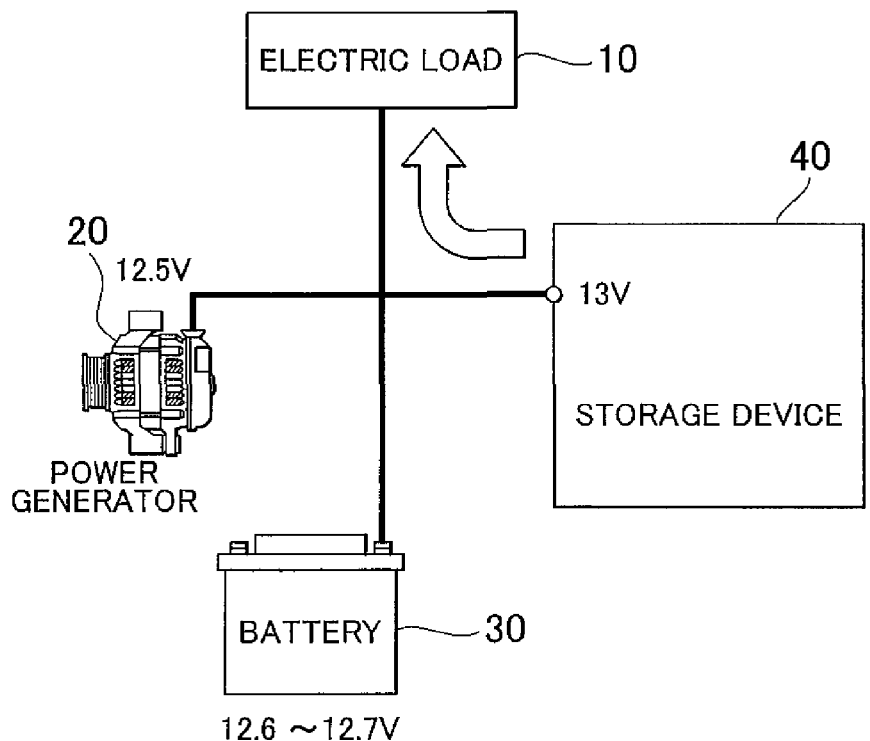

FIG. 3B is a view showing an example of an operation state of step 140 of FIG. 2. FIG. 3B shows an exemplary case where the power generation voltage of the power generator 20 is 12.5 V, the discharge voltage of the battery 30 is 12.6 to 12.7 V, and the discharge voltage of the storage device 40 is 13 V. In this case, the discharge voltage of the storage device 40 is slightly higher than the battery voltage. Therefore, almost all the discharge voltage of the storage device 40 is supplied to the electric load 10. As described above, when the power generation amount of the power generator 20 is not likely to increase or when the battery 30 is not small in capacity, a power is supplied only to the electric load 10. In this case, the discharge voltage is slightly higher than the battery voltage, but it may be counted that the discharge voltage is approximately equal to the battery voltage. Therefore, the discharge voltage does not become unnecessarily high. As a result, the discharge efficiency can be enhanced, and stored electric charges can be used with high efficiency.

Referring back to FIG. 2, when it is determined in step 100 that the vehicle is decelerating, a shift to step 150 is made.

In step 150, the storage device 40 is charged, and the processing flow is then terminated. When the vehicle is decelerating, a regenerative power is being generated. Therefore, a processing of charging the storage device 40 by priority is performed regardless of the storage state of the storage device 40.

Figure 3C:
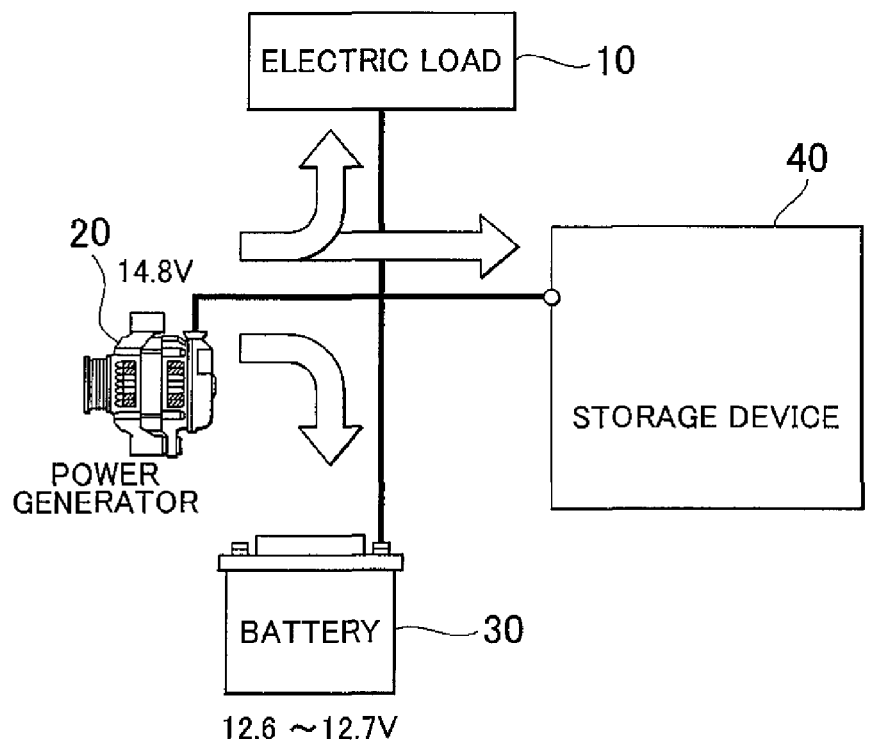

FIG. 3C is a view showing an example of an operation state of step 150 of FIG. 2. In FIG. 3C, the power generation voltage of the power generator 20 is set to 14.8 V. The battery voltage is about 12.6 to 12.7 V as described above. The voltage of the storage device 40 may be about 13 V as described above, or a voltage approximately equal to the battery voltage, namely, 12.6 to 12.7 V. Further, the voltage of the storage device 40 may be set still lower. Thus, the battery 30 and the storage device 40 are supplied and charged with the regenerative power generated from the power generator 20. Thus, when the regenerative power is generated, the storage device 40 swiftly assumes a charge permitting state to recover the regenerative power.

Referring back to FIG. 2, when the vehicle is not decelerating and it is determined in step 110 that the storage capacity of the storage device 40 is smaller than the predetermined capacity, a shift to step 160 is made.

In step 160, the discharge of the storage device 40 is stopped, and the battery 30 and the power generator 20 are caused to discharge to supply a power to the electric load 10.

Figure 3D:
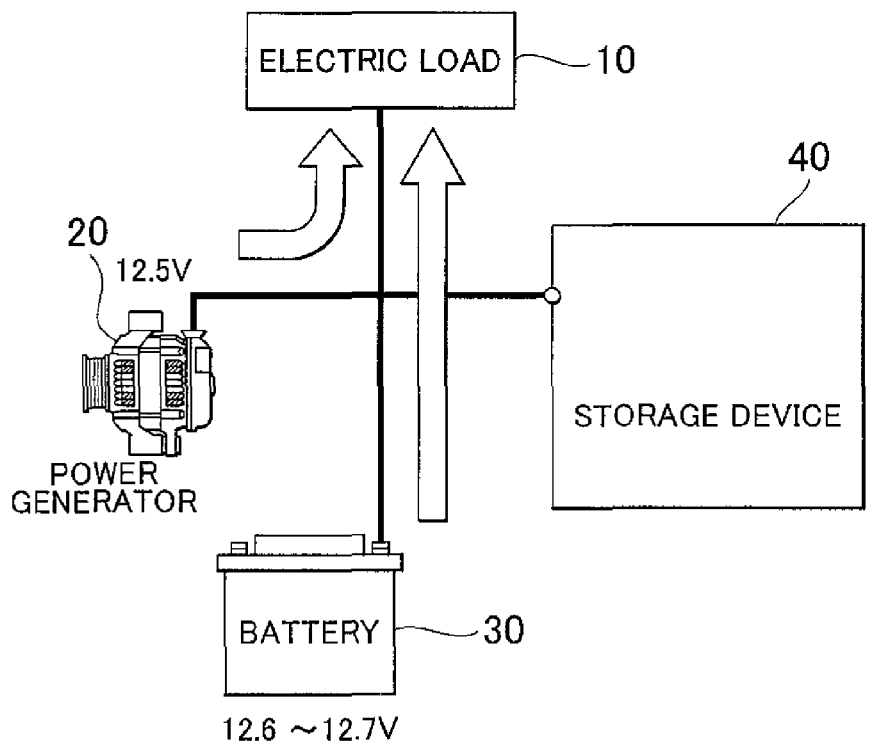

FIG. 3D is a view showing an example of an operation state of step 160. In FIG. 3D, power is supplied from the power generator 20 and the battery 30 to the electric load 10, and no power is supplied from the storage device 40. No electric charges to be supplied to the electric load 10 are stored in the storage device 40. Therefore, power is fed from the power generator 20 and the battery 30 to the electric load 10. It should be noted that in this case, for example, the power generation voltage of the power generator 20 may be 12.5 V and the discharge voltage of the battery may be about 12.6 to 12.7 V.

Thus, as described with reference to FIGS. 2 and 3, the power unit according to this embodiment of the invention swiftly causes the storage device 40 to discharge in preparation for the recovery of the regenerative power despite some deterioration in discharge efficiency when the power generation amount of the power generator is likely to increase clue to the generation of the regenerative power in the case where electric charges are stored in the storage device 40, which stores the regenerative power, and discharges the electric charges in the storage device 40 with high discharge efficiency to enhance the charge/discharge efficiency of the regenerative power and make an improvement in fuel economy possible when no regenerative power is generated and the power generation amount of the power generator is not likely to increase.

FIG. 4 is composed of views for explaining an effect of enhancing the regenerative power efficiency of the power unit according to this embodiment of the invention. FIG. 4A is a view showing a vehicle speed. FIG. 4B is a view showing a regenerative opportunity. FIG. 4C is a view showing a storage capacity of the storage device of the power unit according to this embodiment of the invention together with that of a comparative example.

In FIG. 4A, the vehicle speed increases from a time T1 to a time T2, and the vehicle runs at the same speed from the time T2 to a time T3. The vehicle decelerates from the time T3 to a time T4, and a regeneration opportunity arises as shown in FIG. 4B. At this moment, as shown in FIG. 4C, electric charges are stored in the storage device 40, and the storage amount increases.

As shown in FIG. 4A, the vehicle speed increases from the time T4 to a time T5. At this moment, the vehicle speed is equal to or higher than the discharge promoting vehicle speed. Therefore, the predetermined conditions in step 120 of the flow of FIG. 2 are fulfilled. Thus, as shown in FIG. 4C, the power unit according to this embodiment of the invention discharges electric charges stored in the storage device 40 such that these electric charges are supplied to the electric load 10 and the battery 30 from the time T4 to the time T5 as described with reference to FIG. 3A. Thus, the storage permitting capacity of the storage device 40 can be increased by quickly promoting the discharge of the storage device 40. In contrast, in the control of the power unit according to the comparative example, the storage device 40 always supplies a power only to the electric load 10 as described with reference to FIG. 3B. Thus, as shown in FIG. 4C, discharge of the storage device 40 is not carried out much from the time T4 to the time T5.

From the time T5 to a time T6, the vehicle decelerates again as shown in FIG. 4A, and another regeneration opportunity arises as shown in FIG. 4B. At this moment, as shown in FIG. 4C, in the power unit according to this embodiment of the invention, discharge of the storage device 40 is carried out from the time T4 to the time T5. Therefore, a large amount of power can be recovered until full charge. In contrast, in the control of the power unit according to the comparative example, a state close to full charge emerges at the time T5. Therefore, the state of full charge is immediately attained from the time T5 to the time T6, and the precious opportunity for regenerative charge cannot be sufficiently exploited. It should be noted that a height difference indicated by an arrow represents a regeneration difference Q (i.e., difference Q caused by the regeneration) in FIG. 4C.

Thus, according to the power unit according to this embodiment of the invention, when the power generation amount of the power generator 20 (i.e., amount of power generated by the power generator 20) is expected to increase as in the case of regenerative charge, electric charges stored in the storage device 40 are swiftly discharged to increase the charge permitting capacity of the storage device 40. Charge can thereby be reliably carried out at an opportunity for charge with high efficiency. As a result, the charge efficiency can be enhanced as a whole.

Although the preferred embodiment of the invention has been described above in detail, the invention is not limited to the foregoing embodiment thereof. The foregoing embodiment of the invention can be subjected to various modifications and replacements without departing from the scope of the invention.

The invention can be utilized for various power units employing both power generators and storage batteries. In particular, the invention can be utilized for a vehicular power unit that carries out regenerative charge (a vehicular power unit charged by regeneration).

The invention claimed is:

1. A power unit for a vehicle comprising:
   a power generator connected to an electric load;
   a first storage device connected to the electric load and the power generator;
   a second storage device connected to the electric load, the power generator, and the first storage device; and
   a charge control device that controls charge/discharge, wherein:
   when the charge control device determines that the vehicle is decelerating, power is supplied from the power generator to the first storage device and the second storage device;
   when the charge control device determines that (i) the vehicle is not decelerating and (ii) a storage amount of the second storage device is less than a predetermined storage amount, power is supplied from the power generator and the first storage device to the electric load; and
   when the charge control device determines that (i) the vehicle is not decelerating, (ii) the storage amount of the second storage device is equal to or larger than the predetermined storage amount, and (iii) a predetermined condition is met that indicates that an increase in a power generation amount of the power generator should occur, power is supplied from the second storage device to both the electric load and the first storage device.

2. The power unit according to claim 1, wherein the charge control device supplies the power to the electric load and the first storage device by causing the second storage device to discharge at a charge permitting voltage permitting the first storage device to be charged, and supplies the power to the electric load by causing the second storage device to discharge at a voltage higher than a discharge voltage of the first storage device and lower than the charge permitting voltage.

3. The power unit according to claim 1, wherein the second storage device has a smaller storage capacity than the first storage device.

4. The power unit according to claim 1, wherein the predetermined condition is that a speed of the vehicle be equal to or higher than a vehicle speed at which the discharge of the second storage device is promoted, that a transmission of the vehicle or a shift lever of the vehicle be in a deceleration range and the speed of the vehicle be equal to or higher than a predetermined regeneration permitting vehicle speed, or that a storage amount of the first storage device be equal to or smaller than a predetermined amount.

* * * * *